(12) United States Patent
Park et al.

(10) Patent No.: US 11,922,538 B2
(45) Date of Patent: Mar. 5, 2024

(54) APPARATUS FOR GENERATING EMOJIS, VEHICLE, AND METHOD FOR GENERATING EMOJIS

(71) Applicants: Hyundai Motor Company, Seoul (KR); Kia Corporation, Seoul (KR)

(72) Inventors: Minjae Park, Gyeonggi-do (KR); Sungwang Kim, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 155 days.

(21) Appl. No.: 17/550,477

(22) Filed: Dec. 14, 2021

(65) Prior Publication Data

US 2022/0301232 A1  Sep. 22, 2022

(30) Foreign Application Priority Data

Mar. 19, 2021 (KR) .......... 10-2021-0035839

(51) Int. Cl.
*G06T 11/00* (2006.01)
*G06F 18/2431* (2023.01)
*G06F 40/30* (2020.01)

(52) U.S. Cl.
CPC .......... *G06T 11/00* (2013.01); *G06F 18/2431* (2023.01); *G06F 40/30* (2020.01)

(58) Field of Classification Search
CPC ....... G06T 11/00; G06F 40/30; G06F 18/2431
See application file for complete search history.

(56) References Cited

U.S. PATENT DOCUMENTS

| | | | | |
|---|---|---|---|---|
| 2014/0365209 A1* | 12/2014 | Evermann | ............... | G06F 40/35 704/9 |
| 2016/0019915 A1* | 1/2016 | Khan | ............... | G10L 19/018 704/239 |
| 2017/0083506 A1* | 3/2017 | Liu | ............... | G06V 40/174 |
| 2017/0185581 A1* | 6/2017 | Bojja | ............... | G06V 30/19173 |
| 2019/0133510 A1* | 5/2019 | el Kaliouby | ............... | G08G 1/096725 |
| 2021/0366462 A1* | 11/2021 | Yang | ............... | G06F 40/30 |

FOREIGN PATENT DOCUMENTS

| KR | 2020-0073496 A | 6/2020 | | |
|---|---|---|---|---|
| KR | 20200073496 A | * 6/2020 | ............. | H04N 1/725 |

* cited by examiner

*Primary Examiner* — Terrell M Robinson
(74) *Attorney, Agent, or Firm* — Fox Rothschild LLP

(57) ABSTRACT

An apparatus for generating an emoji includes an analyzer that is configured to, in response to an utterance of a user being input, acquire at least one of context information or information about a sentiment of the user. AN emoji generator generates a new emoji based on emoji generation information including information related to at least two among the context information, the information about the sentiment of the user, and information about an intent of the user corresponding to the utterance. The emoji generator is configured to select a plurality of emojis that match the emoji generation information from among a plurality of stored emojis and combine at least some of the plurality of emojis to generate the new emoji.

16 Claims, 16 Drawing Sheets

FIG. 4

| TRAVELLING ENVIRONMENT | VEHICLE'S STATE | VEHICLE INTERNAL ENVIRONMENT | USER'S STATE |
|---|---|---|---|
| SUNNY, CLOUDY, RAINING, ETC. | HIGH-SPEED TRAVELLING, LOW-SPEED TRAVELLING, STOPPING | NUMBER OF PASSENGERS | FATIGUE |
| ABOVE ZERO, BELOW ZERO, 0–40 DEGREES | TOTAL TRAVELLING TIME, TOTAL TRIP TIME | BOARDING LOCATION OF PASSENGER | DRIVER / PASSENGER |
| BIG CITY, SMALL AND MEDIUM-SIZED CITY, ETC. | VEHICLE TYPE, LARGE, SMALL | VEHICLE INTERNAL TEMPERATURE | DOZING/ EATING / MOVING |
| EXPRESSWAY, GENERAL ROAD, ONE-LANE ROAD, TWO-LANE ROAD, ETC. | | | HUNGRY/ FULL |
| SEASON, MONTH, DAY, YEAR, ANNIVERSARY, ETC. | | | |
| SURROUNDING ENVIRONMENT, SUCH AS CLOSE TO SEA, AND CLOSE TO RIVER | | | |

TEMPERATURE AND WEATHER, TIME

FIG. 5

| EMOJI | EMOJI TAG |
|---|---|
|  | #Hot #Sun #Temperature #Weather |
|  | #Hot #Angry #Unhappy |
|  | #Angry #Unhappy |
|  | #Hand On Wheel #Driving |
|  | #Car #Driving |
|  | #Hungry #Starving |
|  | #Hungry #Food |
| ⋮ | ⋮ |

FIG. 6
| EMOJI GENERATION TAG | EMOJI/EMOJI TAG | MATCHING RATE |
|---|---|---|
| #Hungry |  ① #Hot #Sun #Temperature #Weather | 0.9 |
| #Want Food |  ② #Hot #Angry #Unhappy | 0.8 |
| #Restaurant #Hot |  ③ #Hand On Wheel #Driving | 0.9 |
| #Sun |  ④ #Car #Driving | 0.8 |
| #Hand On Wheel |  ⑤ #Hungry #Starving | 0.8 |
| #Driving |  ⑥ #Hungry #Food | 0.85 |

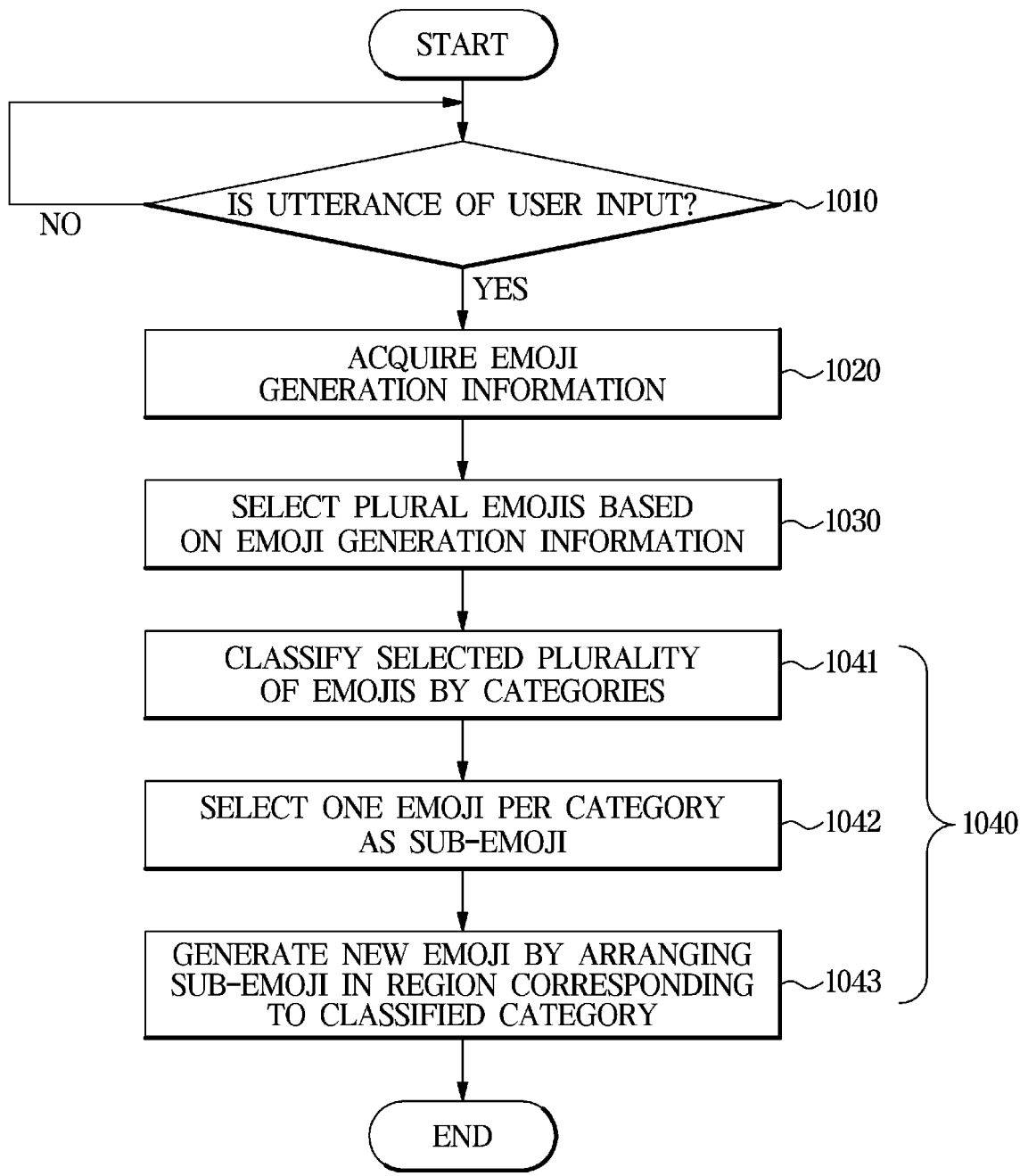

APPARATUS FOR GENERATING EMOJIS, VEHICLE, AND METHOD FOR GENERATING EMOJIS

CROSS-REFERENCE TO RELATED APPLICATION

This application is based on and claims priority under 35 U.S.C. § 119 to Korean Patent Application No. 10-2021-0035839, filed on Mar. 19, 2021, the disclosure of which is incorporated herein by reference.

BACKGROUND

1. Field

The disclosure relates to an emoji generating apparatus for generating an emoji, a vehicle including the same, and a method of generating an emoji.

2. Description of the Related Art

Recently, when text messages are exchanged between users, an emoji is often transmitted together with the text message to indicate the sentiment of the user, the current context, the intent of the user, and the like. There are numerous types of emojis representing various sentiments, contexts, and intents, and when transmitting a text message, a user may directly select a desired emoji and transmit the emoji together with the text.

In addition, recently, for the convenience of the user, a speech recognition service has been developed and provided, in which a user may transmit a text message by uttering a desired message as a speech without directly typing text. In transmitting a text message through the speech recognition service, it is expected that the user's satisfaction may be further improved by transmitting an appropriate emoji corresponding to the user's utterance.

SUMMARY

The present disclosure provides an emoji generating apparatus for generating a new emoji that may most appropriately represent the sentiments or intent of a user or the current context based on information acquired from an utterance of the user, a vehicle including the same, and an emoji generating method. The present disclosure provides an emoji generating apparatus for generating a new emoji by combining a plurality of existing emojis to most appropriately represent the sentiment or intent of a user or the current context, a vehicle including the same, and an emoji generating method.

Additional aspects of the disclosure will be set forth in part in the description which follows and, in part, will be obvious from the description, or may be learned by practice of the disclosure.

According to an aspect of the disclosure, an apparatus for generating an emoji may include: an analyzer configured to, in response to an utterance of a user being input, acquire at least one of context information or information about a sentiment of the user; and an emoji generator configured to generate a new emoji based on emoji generation information including information related to at least two among the context information, the information about the sentiment of the user, and information about an intent of the user corresponding to the utterance, wherein the emoji generator is configured to: select a plurality of emojis that match the emoji generation information from among a plurality of stored emojis; and combine at least some of the plurality of emojis to generate the new emoji.

The emoji generator may be configured to generate a plurality of emoji generation tags representing the emoji generation information. The plurality of emoji generation tags may include at least two among a first emoji generation tag representing the context information, a second emoji generation tag representing the sentiment of the user, and a third emoji generation tag representing the intent of the user. The plurality of emojis may be stored together with a plurality of emoji tags representing the plurality of emojis, respectively.

The emoji generator may be configured to: compare the plurality of emoji generation tags with the plurality of emoji tags, and select a plurality of emojis matching the emoji generation information from among the stored plurality of emojis based on the comparison result. The emoji generator may be configured to: calculate a matching rate between the plurality of emoji generation tags and the plurality of emoji tags; and select an emoji having a matching rate greater than or equal to a reference value from among the stored plurality of emojis.

The emoji generator may be configured to: classify the selected plurality of emojis into a plurality of categories according to characteristic of the emojis; and select at least two emojis from among the selected plurality of emojis as sub-emojis used to generate the new emoji according to the classification result. The emoji generator may be configured to arrange the at least two sub-emojis in a region corresponding to the classified category to generate the new emoji.

The emoji generator may be configured to, in response to a plurality of emojis being classified into one category among the plurality of categories, select an emoji having a highest matching rate among the plurality of emojis as the sub-emoji. The emoji generator may be configured to determine a size of each of the at least two sub-emojis in the new emoji based on a matching rate of each of the at least two sub-emojis.

Further, a vehicle may include: a microphone into which an utterance of a user is input; an analyzer configured to, in response to an utterance of a user being input, acquire at least one of context information or information about a sentiment of the user; a storage configured to store a plurality of emojis; and an emoji generator configured to generate a new emoji based on emoji generation information including information related to at least two among the context information, the information about the sentiment of the user, and information about an intent of the user corresponding to the utterance, wherein the emoji generator is configured to: select a plurality of emojis that match the emoji generation information from among a plurality of stored emojis; and combine at least some of the plurality of emojis to generate the new emoji.

The vehicle may further include a display configured to display the generated new emoji. The emoji generator may be configured to generate a plurality of emoji generation tags representing the emoji generation information. The storage may be configured to store the plurality of emojis together with a plurality of emoji tags representing the plurality of emojis, respectively. The emoji generator may be configured to: compare the plurality of emoji generation tags with the plurality of emoji tags, and select a plurality of emojis matching the emoji generation information from among the stored plurality of emojis based on the comparison result.

The emoji generator may be configured to: classify the selected plurality of emojis into a plurality of categories according to characteristic of the emojis, and select at least two emojis from among the selected plurality of emojis as sub-emojis used to generate the new emoji according to the classification result. The emoji generator may be configured to: arrange the at least two sub-emojis in a region corresponding to the classified category to generate the new emoji.

According to another aspect of the disclosure, a method of generating an emoji may include: in response to an utterance of a user being input, acquiring at least one of context information or information about a sentiment of the user; and generating a new emoji based on emoji generation information including information related to at least two among the context information, the information about the sentiment of the user, and information about an intent of the user corresponding to the utterance, wherein the generating of the new emoji includes: selecting a plurality of emojis that match the emoji generation information from among a plurality of stored emojis; and combining at least some of the plurality of emojis to generate the new emoji.

The generating of the new emoji may include generating a plurality of emoji generation tags representing the emoji generation information. The plurality of emoji generation tags may include: at least two among a first emoji generation tag representing the context information, a second emoji generation tag representing the sentiment of the user, and a third emoji generation tag representing the intent of the user. The plurality of emojis may be stored together with a plurality of emoji tags representing the plurality of emojis, respectively.

The generating of the new emoji may include comparing the plurality of emoji generation tags with the plurality of emoji tags, and selecting a plurality of emojis matching the emoji generation information from among the stored plurality of emojis based on the comparison result. The generating of the new emoji may include calculating a matching rate between the plurality of emoji generation tags and the plurality of emoji tags, and selecting an emoji having a matching rate greater than or equal to a reference value from among the stored plurality of emojis.

Additionally, the generating of the new emoji may include classifying the selected plurality of emojis into a plurality of categories according to characteristic of the emojis, and selecting at least two emojis from among the selected plurality of emojis as sub-emojis used to generate the new emoji according to the classification result. The generating of the new emoji may include arranging the at least two sub-emojis in a region corresponding to the classified category to generate the new emoji. The generating of the new emoji may include, in response to a plurality of emojis being classified into one category among the plurality of categories, selecting an emoji having a highest matching rate among the plurality of emojis as the sub-emoji. In addition, the generating of the new emoji may include determining a size of each of the at least two sub-emojis in the new emoji based on a matching rate of each of the at least two sub-emojis.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 4 is a table showing an example of context information identified by a context analyzer of an apparatus for generating an emoji according to an embodiment, and FIG. 5 is a table showing an example of a plurality of emojis stored in a storage of an apparatus for generating an emoji according to an embodiment;

FIG. 6 is a table illustrating an example of a matching rate between an emoji generation tag generated by an apparatus for generating an emoji and a stored emoji tag according to an embodiment;

FIG. 16 is a detailed flowchart showing a process of generating a new emoji by combining a plurality of emojis, in a method of generating an emoji according to an embodiment.

DETAILED DESCRIPTION

Figure 1:
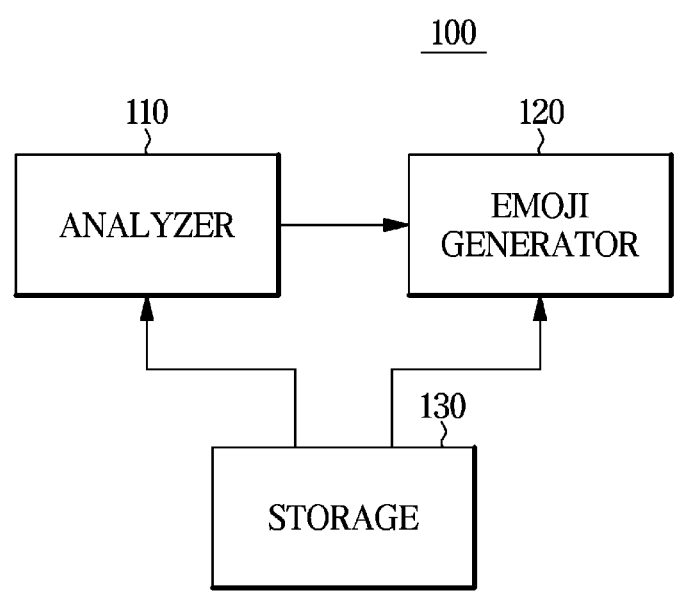
FIG. 1 is a control block diagram illustrating an apparatus for generating an emoji according to an embodiment.

The embodiments set forth herein and illustrated in the configuration of the present disclosure are only preferred embodiments, so it should be understood that they may be replaced with various equivalents and modifications at the time of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The terms, such as "~ part", "~device", "~block", "~member", "~ module", and the like may refer to a unit for processing at least one function or act. For example, the terms may refer to at least process processed by at least one hardware, such as field-programmable gate array (FPGA)/ application specific integrated circuit (ASIC), software stored in memories, or processors. Although the terms "first," "second," "A," "B," etc. may be used to describe various components, the terms do not limit the corresponding components, but are used only for the purpose of distinguishing one component from another component.

Reference numerals used for method steps are just used for convenience of explanation, but not to limit an order of the steps. Thus, unless the context clearly dictates otherwise, the written order may be practiced otherwise.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a non-transitory computer-readable recording medium.

The non-transitory computer-readable recording medium includes all types of recording media in which instructions which may be decoded by a computer are stored, for example, a Read Only Memory (ROM), a Random Access Memory (RAM), a magnetic tape, a magnetic disk, a flash memory, an optical data storage device, and the like.

Hereinafter, an embodiment of a dialogue system, a vehicle, and a control method thereof according to an aspect will be described in detail with reference to the accompanying drawings.

FIG. 1 is a control block diagram illustrating an apparatus for generating an emoji according to an embodiment.

Referring to FIG. 1, an apparatus 100 for generating an emoji according to an embodiment may include: an analyzer 110 configured to, in response to an utterance of a user being input being, acquire at least one of context information or information about a sentiment of the user; a storage 130 configured to store a plurality of emojis; and an emoji generator 120 configured to generate a new emoji based on emoji generation information including information related to at least two among a current context, a sentiment of a user, or an intent of a user corresponding to an utterance. In the present embodiment, a new emoji refers to an emoji different from a single emoji that has been previously used, stored or registered.

The apparatus 100 for generating an emoji may be included in a user terminal provided with an input/output interface, such as a microphone and a display, or may be included in an external server connected to the user terminal through wireless communication. The user terminal may be a mobile device, such as a smart phone, a wearable device, or a tablet personal computer (PC), or may be a vehicle in which the user rides. The apparatus 100 for generating an emoji according to the embodiment only needs to perform an operation to be described below, and there is no limitation on where the apparatus 100 for generating an emoji is provided.

The analyzer 110 and the emoji generator 120 may include at least one memory in which a program for performing an operation to be described below is stored and at least one processor for executing the stored program. The analyzer 110 and the emoji generator 120 may share a memory or a processor, and also may use separate memories or processors. The storage 130 may include a non-volatile memory, such as a read only memory (ROM), a flash memory, a hard disk, and an optical disk drive. The storage 130 may also share a memory with the analyzer 110 or the emoji generator 120 or may use a separate memory.

Figure 2:
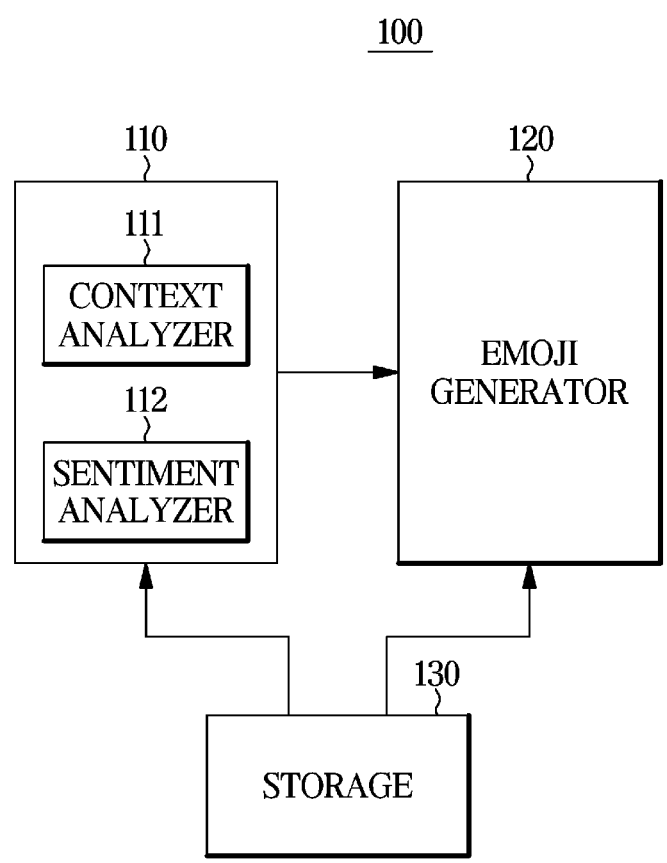
FIG. 2 is a control block diagram specifically illustrating a configuration of an apparatus for generating an emoji according to an embodiment.

FIG. 2 is a control block diagram specifically illustrating a configuration of an apparatus for generating an emoji according to an embodiment. Referring to FIG. 2, the analyzer 110 may include a context analyzer 111 configured to analyze the current context based on an utterance of a user and context information acquired from various sensors, and an sentiment analyzer 112 configured to analyze the sentiment of a user based on an utterance of the user.

When a user inputs an utterance through a microphone 230 (see FIG. 3) provided in the user terminal, speech recognition and natural language understanding on the user's utterance may be performed by the user terminal or an external server connected to the user terminal. Accordingly, the user terminal or the external server may include a speech to text (STT) engine for performing a speech recognition, and an utterance of a user may be subject to a speech recognition algorithm and thus converted into text.

For example, the STT engine may use feature vector extraction technologies, such as Cepstrum, Linear Predictive Coefficient (LPC), Mel Frequency Cepstral Coefficient (MFCC) or Filter Bank Energy, to extract a feature vector from an utterance of a user. Then, the extracted feature vector is compared with a trained reference pattern to provide a recognition result. Accordingly, an acoustic model that models and compares signal characteristics of a speech or a language model that models a linguistic order relationship of words or syllables corresponding to a recognized vocabulary may be used.

In addition, the STT engine may also be configured to convert a user's utterance into spoken text based on a learning using a machine learning or deep learning. In the present embodiment, there is no restriction on a method in which the STT engine converts an utterance of a user into spoken text, and the STT engine may convert an utterance of user into spoken text by applying various speech recognition technologies in addition to the above-described method. In addition, the user terminal or the external server may include a natural language understanding (NLU) engine for performing natural language understanding, and the NLU engine may be configured to identity an intent of a user by applying the NLU technology to an input sentence. Text output based on a user's utterance being subjected to a speech recognition in the STT engine may be input to the NLU engine as an input sentence.

For example, the NLU engine may be configured to recognize an entity name from an input sentence. An entity name is a proper noun, such as a person's name, a place name, an organization name, a time, a date, money, etc., and the recognition of an entity name is a task of identifying an entity name in a sentence and determining the type of the identified entity name. Through the recognition of the entity name, an important keyword may be extracted from a sentence and the meaning of the sentences may be grasped.

In addition, the NLU engine may be configured to determine a domain from the input sentence. The domain may allow the subject of the input sentence to be identified. For example, domains representing various subjects, such as home appliance control, schedule, a weather, or information provision of traffic condition, texting, navigation, vehicle control, etc. may be determined based on the input sentence. In addition, the NLU engine may be configured to analyze a speech act of the input sentence. The analysis of a speech act is a task of analyzing the purpose of the utterance (e.g., spoken speech), and is to grasp the purpose of the utterance, such as whether the user asks a question, makes a request, responds, or expresses a simple sentiment.

The NLU engine may, based on information, such as a domain, an entity name, a speech act, etc. extracted from the spoken text, identify an intent and an entity required to perform a function corresponding to the intent. For example, when the user's utterance is "Turn on the air conditioner", the domain may be [vehicle control], the intent may be [turn on, air conditioner], and the entity required to perform a control corresponding to the intent may be [temperature, air volume].

The intent may be determined by an action and a target. In the above example, the action may be "turned on", and the target may be "air conditioner". However, because terms may vary between different dialog systems, a term "operator" instead of "action" and a term "object" instead of "target" may be used. Regardless of the terms used, anything may be included in the scope of the action and the target according to the embodiment as long as they can determine or define an intent corresponding to an utterance of a user.

The context analyzer 111 may be configured to identify the current context. The current context refers to a context at a time when the user inputs an utterance or a context within a predetermined period of time before and after a time when the user inputs an utterance. The context analyzer 111 may be configured to identify the current context based on information acquired from the user terminal or other external server, or identity the current context based on the user's utterance converted into text or based on the user's intent.

The sentiment analyzer 112 may be configured to identity the current sentiment of the user. The current sentiment refers to a sentiment at a time the user inputs an utterance or the sentiment within a predetermined period of time before and after the user inputs an utterance. The sentiment analyzer 112 may be configured to identify the sentiment of the user based on an output of the STT engine or the NLU engine, or may identity the sentiment of the user based on a speech signal of the user.

The emoji generator 120 may be configured to generate a new emoji based on emoji generation information. The emoji generation information may include information related to at least two among context information, information about a sentiment of a user, or information about an intent of a user. The emoji generator 120 may be configured to, when generating a new emoji, combine two or more emojis among a plurality of emojis stored in the storage 130. However, the plurality of emojis may be stored in another external server that provides emojis, rather than being stored in the storage 130 provided in the apparatus 100 for generating an emoji. In particular, the apparatus 100 for generating an emoji may access the external server for providing emojis and acquire the stored emoji and related information.

Hereinafter, an operation of generating a new emoji by the apparatus 100 for generating an emoji according to an embodiment will be described with reference to a specific example. As described above, the apparatus 100 for generating an emoji may be provided in the user terminal, and the user terminal may include a vehicle. Hereinafter, specific operations will be described using an example in which the apparatus 100 for generating an emoji is provided in a vehicle.

Figure 3:
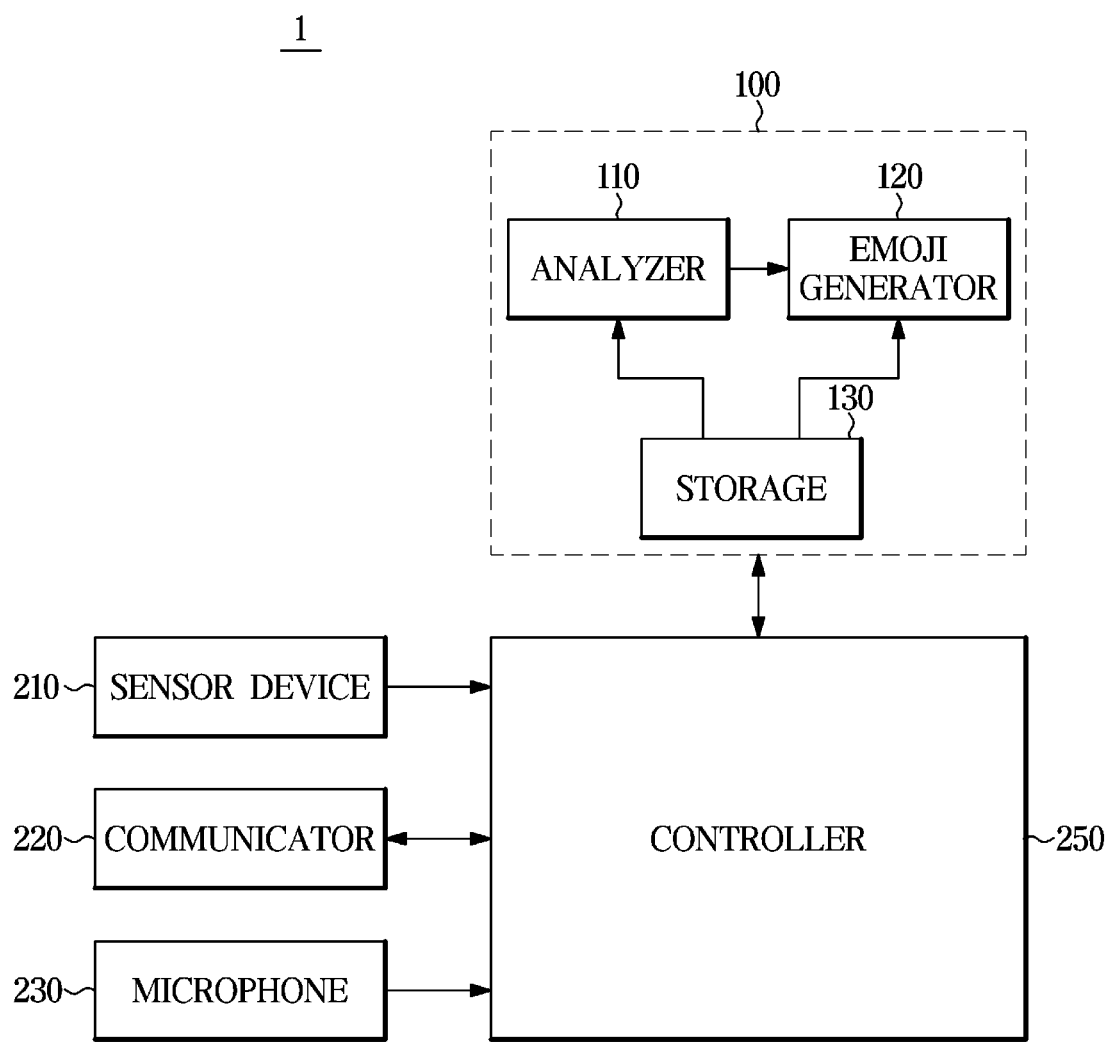
FIG. 3 is a control block diagram illustrating a vehicle including an apparatus for generating an emoji according to an embodiment.

FIG. 3 is a control block diagram illustrating a vehicle including an apparatus for generating an emoji according to an embodiment. Referring to FIG. 3, the vehicle 1 may include, not only the apparatus 100 for generating an emoji described above, but also a sensor device 210 configured to acquire information about traveling environment or an internal environment of the vehicle, a communicator 220 configured to exchange information with an external server, another vehicle or an external electronic device through a wireless communication, and a microphone 230 to which an utterance of a user is input.

In the embodiment to be described below, an operation of generating a new emoji by the apparatus 100 for generating an emoji in association with components provided in the vehicle 1 will be described in detail. However, descriptions of other well-known components related to traveling of the vehicle will be omitted.

FIG. 4 is a table showing an example of context information identified by a context analyzer of an apparatus for generating an emoji according to an embodiment, and FIG. 5 is a table showing an example of a plurality of emojis stored in a storage of an apparatus for generating an emoji according to an embodiment.

The sensor device 210 provided in the vehicle 1 includes at least of a camera including at least one of a front camera, a rear camera, an internal camera, or a stereo camera, a vehicle speed sensor, a global positioning system (GPS), a temperature sensor, a rain sensor, and an obstacle sensor (an infrared sensor, an ultrasonic wave sensor, or a laser sensor), a steering wheel sensor, or a seat sensor that are capable of acquiring information about a traveling environment, a vehicle's state, a user's state, or an internal environment of a vehicle.

The communicator 220 may include a wireless communication module or a wired communication module, and may acquire traveling environment information, such as weather information, traffic information, and navigation information, from an external server or other electronic device connected through wireless communication or wired communication.

The context information used by the emoji generator 120 to generate a new emoji may include information about a user's state. The user's state may include various physical conditions and actions except for the user's sentiments, such as user's fatigue, user's body temperature, user's weight, and user's behavior. Such information about the user's state may be acquired from the sensor device 210, may be acquired through the communicator 220, or may be acquired from an utterance of a user.

Referring to the example of FIG. 4, the context information identified by the context analyzer 111 may include such information as a temperature, a weather, and a time, and the information may be acquired through the sensor device 210 or the communicator 220. In addition, the context information identified by the context analyzer 111 may include information regarding a traveling environment, such as information about a latitude and longitude of the current location, whether the current location is a large city or a small city, whether the current location is a highway or a general road, whether the current road is a one-lane road or a two-lane road, and information about whether the current location is adjacent to the sea or a river. Such information may also be acquired through the sensor device 210 or the communicator 220.

In addition, the context information identified by the context analyzer 111 may include information regarding a vehicle's state, such as information about whether the vehicle is in a state of high speed traveling or slow traveling, information about whether the vehicle is in a traveling state or a stopped state, information about the total traveling time, information about the type of the vehicle, etc., and such information may also be acquired through the sensor device 210 and stored in the storage 130 in advance.

In addition, the context information identified by the context analyzer 111 may include information about the user's state, such as the user's fatigue, whether the user is a driver or a passenger, and whether the user is sleeping, moving, or eating. Such information may be acquired through an internal camera or seat sensor or the microphone 230 included in the sensor device 210, or information acquired from a wearable device worn by the user may be transmitted through the communicator 220. In addition, the sensor device 210 may include a sensor configured to acquire information about the user's state in a region that may come in contact with the user's body, such as a steering wheel. In addition, the context information identified by the context analyzer 111 may include information about the internal environment of the vehicle, such as the number of passengers in the vehicle 1, the boarding positions of the passengers, and the temperature inside the vehicle. Such information may be acquired through the sensor device 210.

Meanwhile, the context analyzer 111 may be configured to, upon an utterance of a user being input, request required information from the sensor device 210 or the communicator 220 to acquire the required information. Alternatively, regardless of a request of the context analyzer 111, information acquired by the sensor device 210 or the communicator 220 may be stored in the storage 130, and the context analyzer 111 may retrieve information acquired at a time when the user's utterance is input, or within a predetermined period of time before or after the user's utterance is input, from the storage 130.

In addition, the context analyzer 111 may not only request the acquisition of the information from the sensor device 210 or the communicator 220 or retrieve the information stored in the storage 130, but also may perform additional identification using the acquired information. As described above, the context analyzer 111 may be configured to identify the context information based on the user's utterance converted into text. For example, when the user's utterance includes content "I am driving now", the context analyzer 111 may identify the user's state as a state of driving.

Alternatively, when the user's utterance includes content "I'm hungry", the context analyzer 111 may identity the user's state as a state of being hungry, and when the user's utterance includes content "I'm too full", the context analyzer 111 may identify the user's state as a state of being full. Alternatively, when the user's utterance includes content "I'm running very fast on the highway", the context analyzer 111 may identify the vehicle's state as a state of high-speed traveling, identity the traveling environment as a highway, and identify the user's state as a state of driving.

The context information shown in the table of FIG. 4 is only an example of context information acquired by the context analyzer 111, and the embodiment of the apparatus 100 for generating an emoji is not limited thereto. Accordingly, in addition to the information shown in FIG. 4, various types of information may be included in the emoji generation information.

The sentiment analyzer 112 may be configured to identify the user's sentiment based on the user's utterance converted into text or the user's intent. For example, if the user's utterance includes content representing sentiments, such as "annoyed", "angry", and "sad", the sentiment analyzer 112 may identify the user's sentiment based on the output of the STT engine or the output of the NLU engine. In addition, the sentiment analyzer 112 may be configured to identify the user's sentiment based on a speech signal of the user. For example, the sentiment analyzer 112 may use features, such as a tone, a pitch, a formant frequency, a speech speed, and a voice quality of a speech signal, to identify a sentiment, such as happiness, sadness, anger, hate, surprise, and fear. In addition, the sentiment analyzer 112 may be configured to identify the user's sentiment using one of various techniques for determining sentiments of a speaker using a speech signal.

As described above, the emoji generator 120 may be configured to generate a new emoji based on the emoji generation information, and the emoji generation information may include information related to at least two among context information, information about a sentiment of a user, and information about an intent of a user. When the emoji generator 120 does not use context information, the context analyzer 111 may be omitted from the above configuration. When the emoji generator 120 does not use information about a sentiment of a user, the sentiment analyzer 112 may be omitted from the above configuration. In the embodiment to be described below, a case in which the emoji generator 120 generates a new emoji based on context information, information about a sentiment of a user, and information about an intent of a user will be described as an example for detailed description.

Referring to FIG. 5, a plurality of emojis may be stored in the storage 130 together with a plurality of emoji tags. An emoji tag may be metadata representing characteristics of an emoji. For one emoji, one emoji tag may be stored or a plurality of emoji tags may be stored. The emoji generator 120 may be configured to select at least two emojis that match the emoji generation information from among the stored plurality of emojis, and may combine the selected at least two emojis to generate a new emoji.

To select an emoji matching the emoji generation information, the emoji generator 120 may be configured to generate an emoji generation tag representing the emoji generation information. The emoji generator 120 may be configured to compare the generated emoji generation tag with the stored emoji tag to select an emoji matching the emoji generation information. Specifically, the emoji generator 120 may be configured to generate a first emoji generation tag that represents context information, a second emoji generation tag that represents a sentiment of a user, and a third emoji generation tag that represents an intent of a user. For example, when the context information indicates that the user is driving and is hungry, and the weather is hot, the first emoji generation tag generated by the emoji generator 120 may include tags #Driving, #Hand on Wheel, #Hungry, #Hot, and #Sun.

In addition, when the information about the intent of the user indicates that the user currently desires to have a meal, the second emoji generation tag generated by the emoji generator 120 may include tags #Want Food and #Restaurant. In addition, when the information about the sentiment of the user indicates irritation, the third emoji generation tag generated by the emoji generator 120 may include tags #Unhappy and #Angry. The emoji generator 120 may be configured to compare the emoji generation tags representing the emoji generation information with the plurality of emoji tags for the stored plurality of emojis to calculate the matching rates. The matching rate calculated for each emoji tag indicates the degree to which the emoji tag matches the emoji generation tag, and may also indicate the degree to which the corresponding emoji matches the emoji generation information.

FIG. 6 is a table illustrating an example of a matching rate between an emoji generation tag generated by an apparatus for generating an emoji and a stored emoji tag according to an embodiment. The emoji generator 120 may be configured to, to select an emoji matching the emoji generation information, calculate a matching rate between the emoji generation tag and the emoji tag in various ways. For example, with regard to emoji tags of an emoji, if there is one tag identical to the emoji generation tag, 0.8 may be assigned, and from two or more tags being identical to the emoji generation tags, 0.1 may be assigned for each tag identical. In addition, if two or more words are included in one tag and some word is identical between the emoji generation tag and the emoji tag, 0.5 may be assigned, and from two or more words identical between the emoji generation tag and the emoji tag, 0.05 may be assigned for each word identical.

A method of calculating the matching rate will be described in detail using the example of FIG. 6. According to the example of FIG. 6, when the emoji generation tags generated based on the emoji generation information include tags #Hungry, #Want Food, #Restaurant, #Hot, #Sun, and #Driving, #Hand on Wheel, emojis having the same or similar emoji tags as the emoji generation tags, among the stored plurality of emojis are shown in the second column, and the matching rate calculated by comparing the emoji tag for each emoji with the emoji generation tag is shown in the third column.

In order to indicate emojis, a circled number is randomly assigned to each emoji. Specifically, emoji ① 1 has emoji tags #Hot and #Sun identical to the emoji generation ' tags among the emoji tags. Accordingly, with the above-described matching rate calculation method, the matching rate of emoji ① may be calculated as 0.9.

Emoji ② has an emoji tag #Hot identical to the emoji generation tag among the emoji tags. Accordingly, with the above-described matching rate calculation method, the matching rate of emoji ② may be calculated as 0.8.

Emoji ③ has emoji tags #Hand on Wheel and #Driving identical to the emoji generation tags among the emoji tags. Accordingly, with the above-described matching rate calculation method, the matching rate of emoji ③ may be calculated as 0.9.

Emoji ④ has an emoji tag #Driving identical to the emoji generation tag among the emoji tags. Accordingly, with the above-described matching rate calculation method, the matching rate of emoji ④ may be calculated to be 0.8.

Emoji ⑤ has an emoji tag #Hungry identical to the emoji generation tag among the emoji tags. Accordingly, with the above-described matching rate calculation method, the matching rate of emoji ⑤ may be calculated as 0.8.

Emoji ⑥ has an emoji tag #Hungry identical to the emoji generation tag among the emoji tags, and has an emoji tag #Food identical to some word of the emoji generation tag #Want Food. Accordingly, with the above-described matching rate calculation method, the matching rate of emoji ⑥ may be calculated as 0.85.

Meanwhile, the emoji generator 120 may be configured to only select an emoji having a calculated matching rate greater than or equal to a reference value as an emoji matching the image generation information. For example, when the reference value is set to 0.8, only emoji having a matching rate of 0.8 or higher with the emoji generation information may be used to generate a new emoji.

Figure 7:
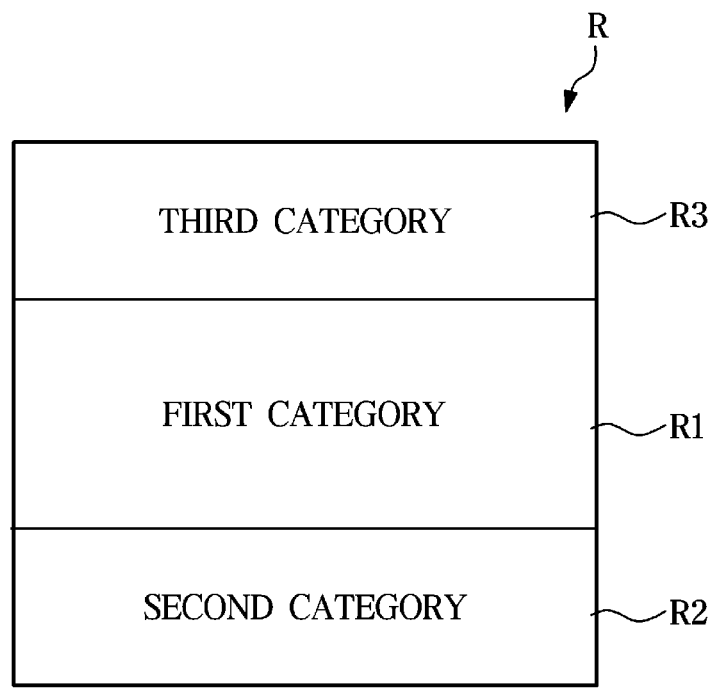
FIG. 7 is a diagram illustrating an example of a layout of a new emoji generated by an apparatus for generating an emoji according to an embodiment.
Figure 8:
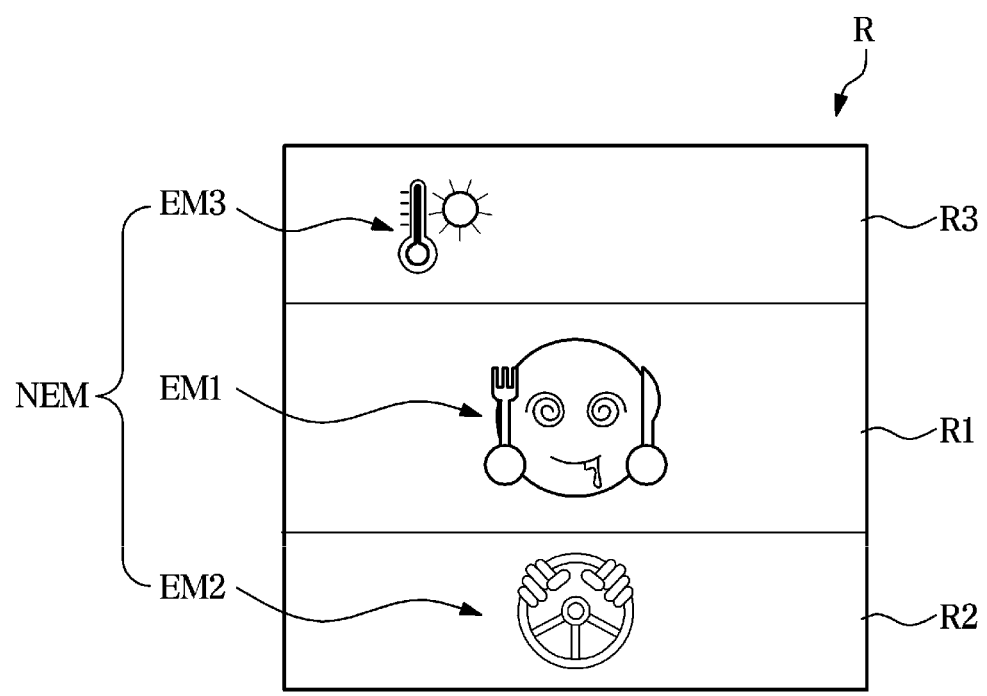
FIG. 8 is a diagram illustrating an example of a new emoji generated by an apparatus for generating an emoji according to an embodiment.

FIG. 7 is a diagram illustrating an example of a layout of a new emoji generated by an apparatus for generating an emoji according to an embodiment, and FIG. 8 is a diagram illustrating an example of a new emoji generated by an apparatus for generating an emoji according to an embodiment am.

The emoji generator 120 may be configured to generate a new emoji by combining two or more emojis selected from the stored plurality of emojis. In particular, each emoji constituting the new emoji will be referred to as a sub-emoji. The emoji generator 120 may be configured to arrange two or more sub-emojis according to a predetermined layout. Referring to the example of FIG. 7, an emoji region R in which a new emoji is arranged or displayed is divided into third portions along the vertical direction, and a center position P1 among the three positions inside the emoji region R may be referred to as a first position, a lower position P2 may be referred to as a second position, and an upper position P3 may be referred to as a third position.

The emoji generator 120 may be configured to arrange each of the plurality of sub-emojis at an appropriate position among three positions. The emoji generator 120 may be configured to classify a plurality of emojis selected according to the matching rates into a plurality of categories according to characteristics of the emoji, to determine the position of each sub-emoji. For example, the categories according to the characteristics of the emoji may be divided into three types of categories of a first category, a second category, and a third category corresponding to the layout of the new emoji.

If the emoji is an emoji that represents a face or facial expression of a person, the emoji is classified into the first category, and if the emoji is an emoji that represents various objects, a specific action of a person, or an object together with a body part of a person, the emoji is classified into the second category. In addition, if the emoji is an emoji that represents a context, such as a surrounding background, environment, or weather, the emoji may be classified into the third category.

Meanwhile, when two or more emojis are included in the same category, the emoji generator 120 may select an emoji having the highest matching rate among the two or more emojis included in the same category as a sub-emoji constituting a new emoji. In this case, if there is less than one sub-emoji selected, the emoji generator 120 may not generate a new emoji.

The emoji generator 120 may be configured to generate a new emoji by arranging two or more sub-emojis at positions corresponding to each classified category. For example, a sub-emoji classified into the first category is arranged in the first region, a sub-emoji classified into the second category is arranged in the second region, and a sub-emoji classified into the third category is arranged in the third region.

According to the classification criteria of categories described above, emoji ① shown in FIG. 6 may be classified into the third category, emoji ② may be classified into the first category, emoji ③ may be classified into the second category, emoji ④ may be classified into the second category, emoji ⑤ may be classified into the first category, and emoji ⑥ may be classified into the first category.

Since the first category includes a plurality of emojis, that is, emoji ② (a matching rate: 0.8), emoji ⑤ (a matching rate: 0.8), and emoji ⑥ (a matching rate: 0.85), emoji ⑥ having the highest matching rate among the plurality of emojis may be selected as a sub-emoji. Since the second category also includes a plurality of emojis, that is, emoji ③ (a matching rate: 0.9) and emoji ④ (a matching rate: 0.8), emoji ③ having the highest matching rate may be selected as a sub emoji.

Since the third category includes only one emoji, that is, emoji ①, the emoji 1 may be selected as a sub emoji. Since a total number of the selected sub-emojis is three, the emoji generator 120 may combine the three selected sub-emojis to generate a new emoji. As shown in FIG. 8, a sub-emoji EM1 selected from the first category is arranged in the first region R1, a sub-emoji EM2 selected from the second category is arranged in the second region R2, and a sub-emoji EM3 selected from the third category is arranged in the third region R3 to generate a new emoji NEM. According to the above-described embodiment, the apparatus 100 for generating an emoji may not use the existing emoji as it is, but may newly generate and provide an appropriate emoji suitable for various contexts at a time of the user's utterance.

Figure 9:
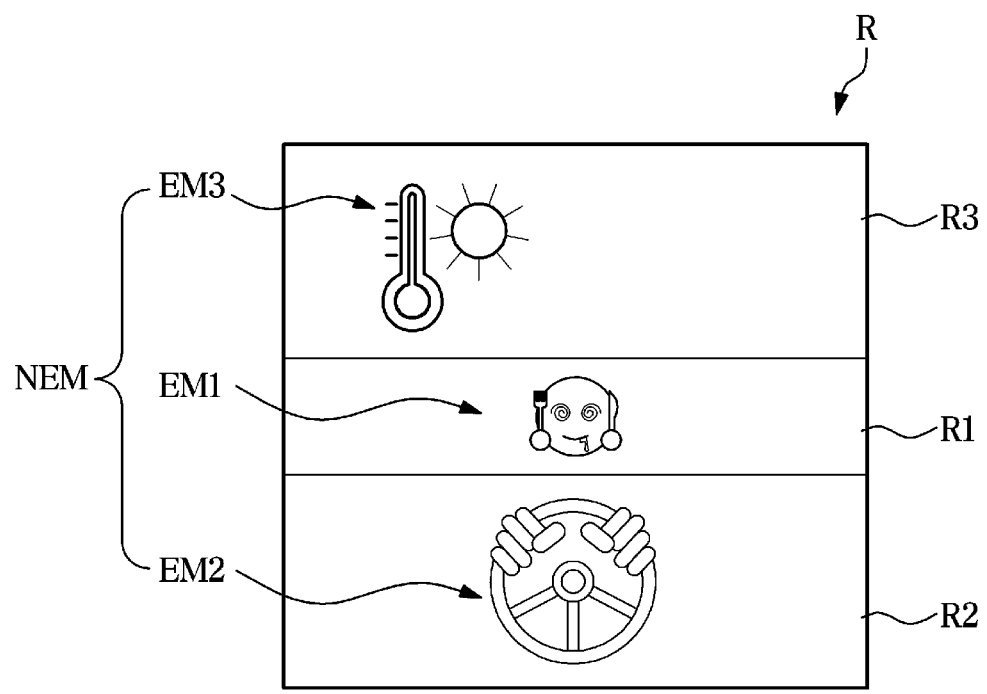
FIG. 9 is a diagram illustrating an operation of adjusting the size of a sub emoji by an apparatus for generating an emoji according to an embodiment.

FIG. 9 is a diagram illustrating an operation of adjusting the size of a sub emoji by an apparatus for generating an emoji according to an embodiment. The emoji generator 120 may also be configured to adjust the size of each sub-emoji according to the matching rate of the sub-emoji constituting the new emoji. For example, a sub-emoji with a higher matching rate may be set to be larger in the new emoji, and a sub-emoji with a lower matching rate may be set to be smaller in the new emoji.

Referring to FIG. 9, among sub-emojis EM1, EM2, and EM3 constituting one new emoji, sub-emojis with the highest matching rate include emoji ③ (EM2/a matching rate: 0.9) belonging to the second category and emoji ① (EM3/a matching rate: 0.9) belonging to the third category, and a sub-emoji with the lowest matching rate is emoji ⑥ (EM1/a matching rate: 0.85) belonging to the first category.

Accordingly, the emoji generator 120 may be configured to increase the sizes of the emoji belonging to the second category and the emoji belonging to the third category to be larger than the size of the emoji belonging to the first category. In other words, the emoji generator 120 may be configured to display an emoji having a high matching rate with the context information, the user's intent, or the user's sentiment to be greater, thereby further emphasizing a part appropriate to the current context.

Hereinafter, an operation of providing a user with a new emoji generated according to the above-described method will be described.

Figure 10:
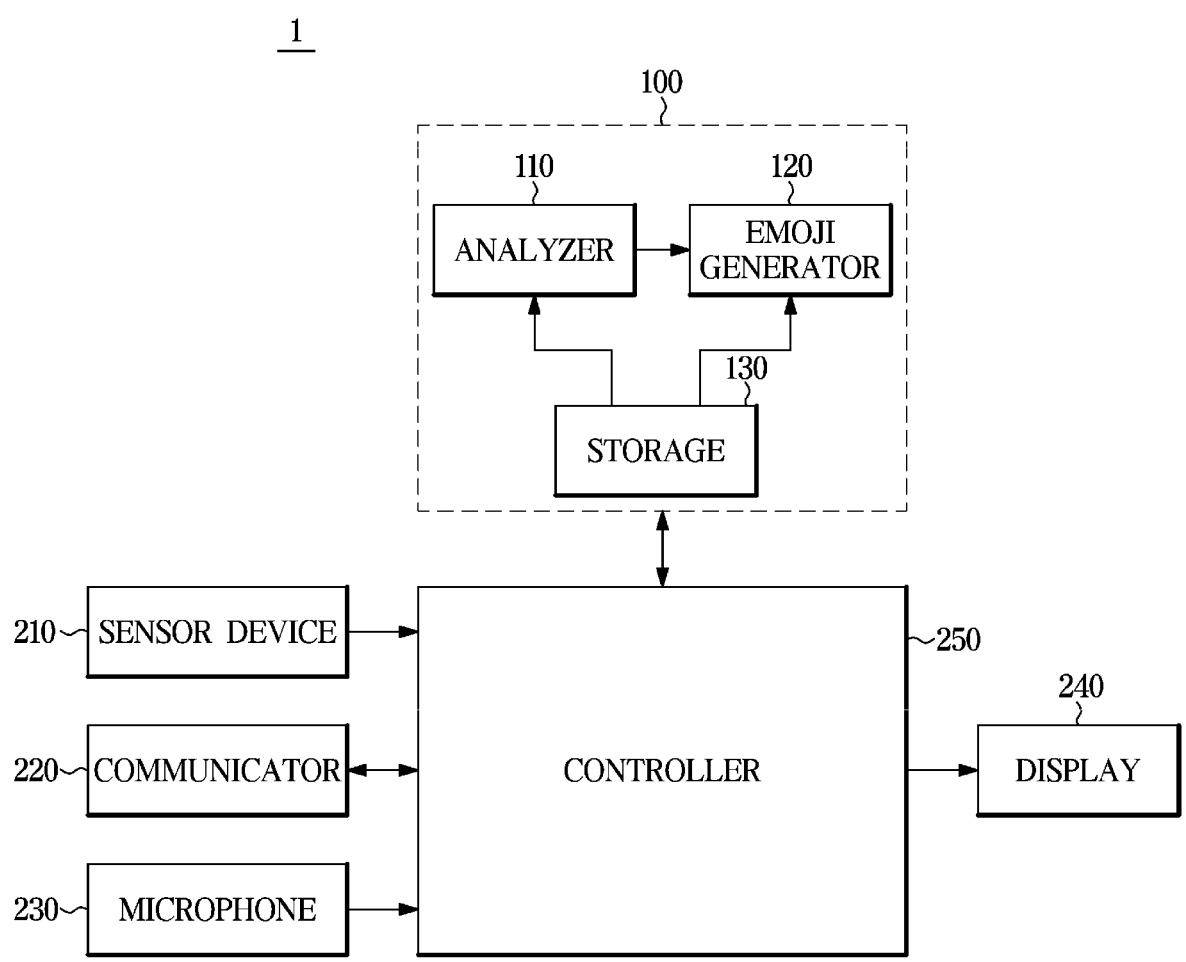
FIG. 10 is another control block diagram illustrating a vehicle according to an embodiment.
Figure 11:
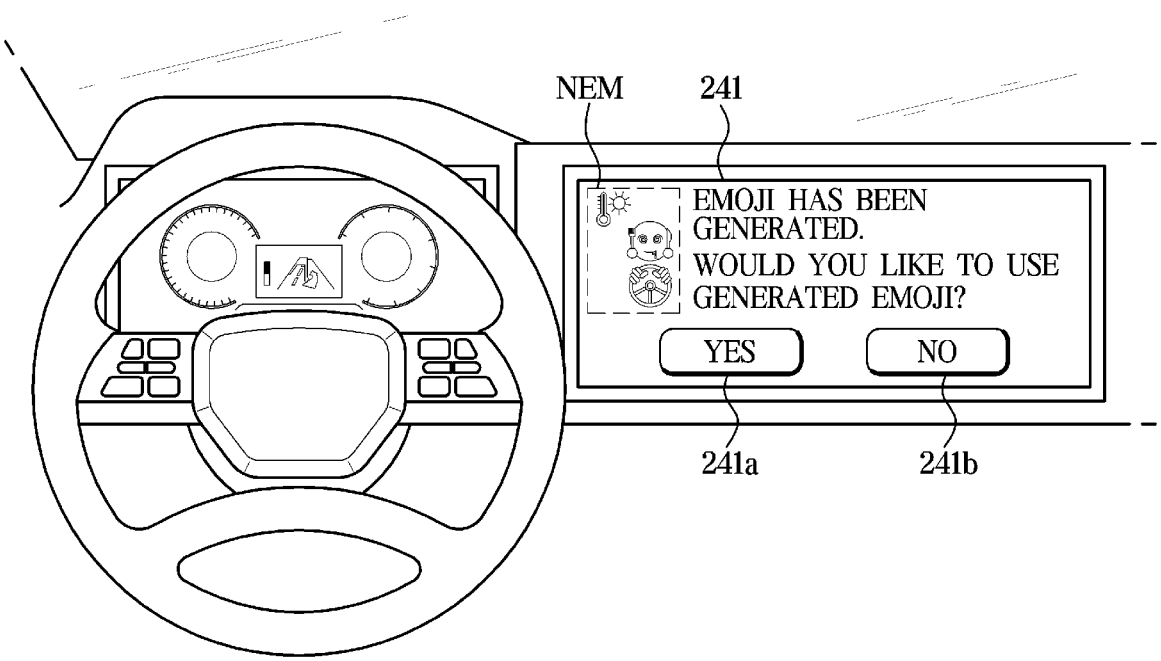
FIGS. 11 to 13 are diagrams illustrating examples of screens displayed on a display to provide a user with a new emoji generated by a vehicle according to an embodiment.
Figure 12:
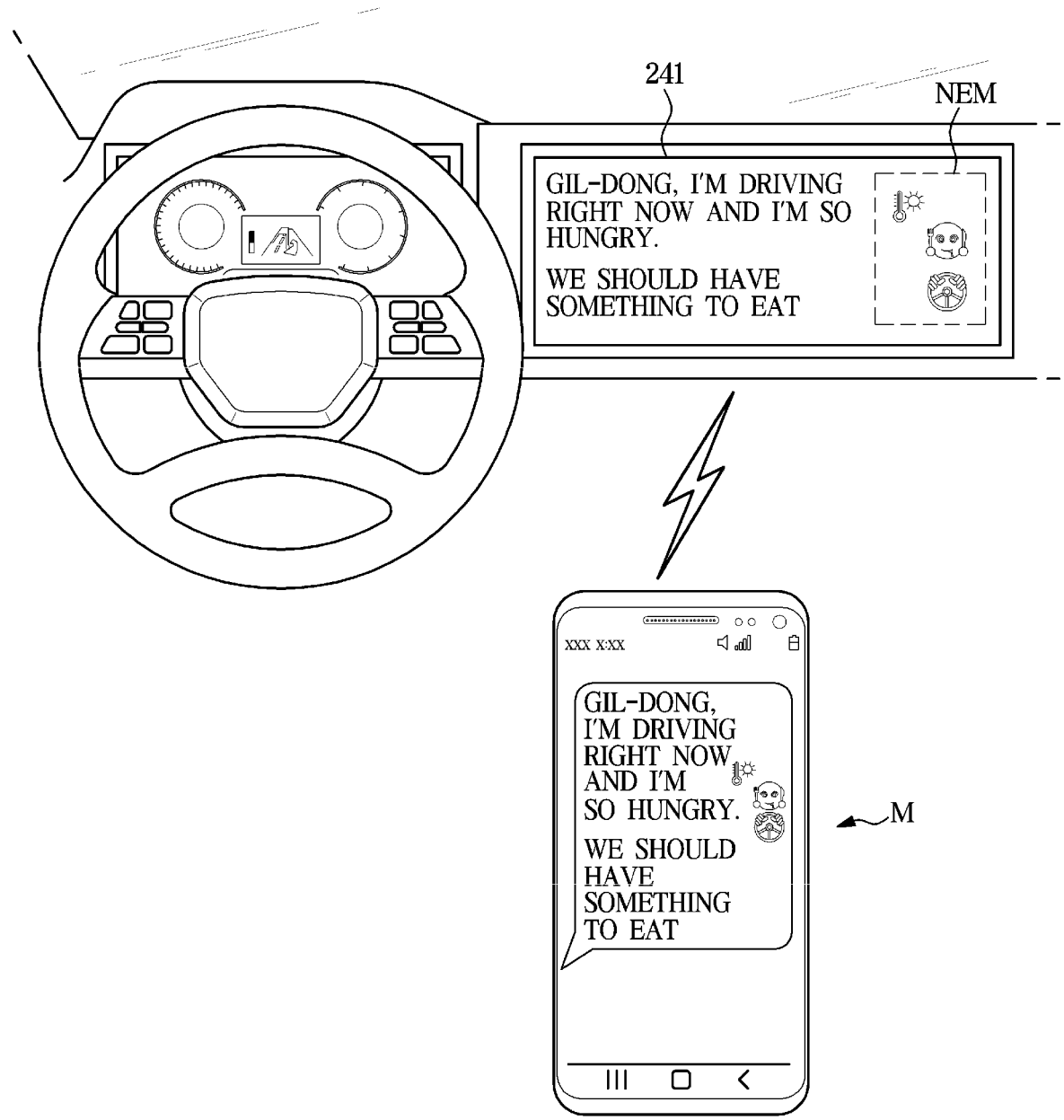
Figure 13:
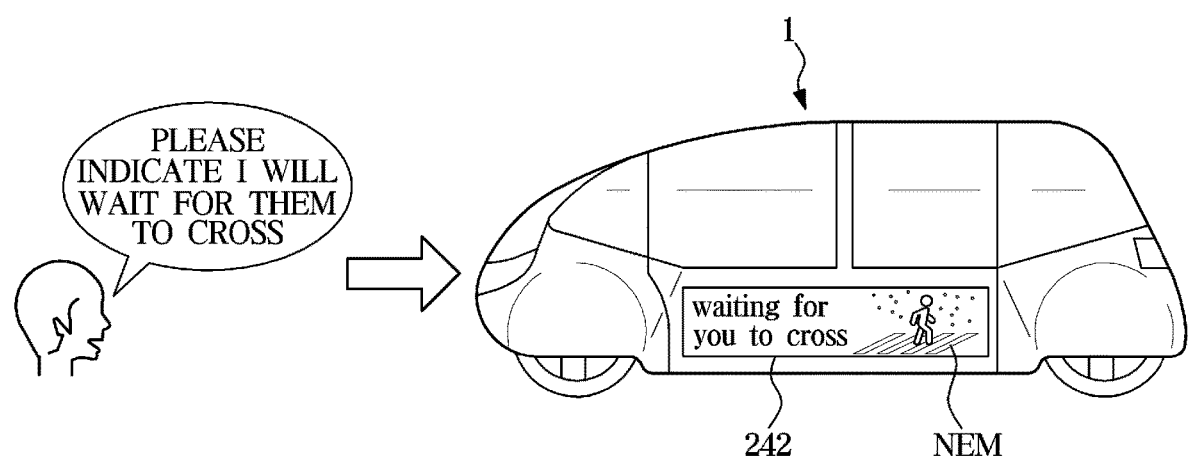

FIG. 10 is another control block diagram illustrating a vehicle according to an embodiment, and FIGS. 11 to 13 are diagrams illustrating examples of screens displayed on a display to provide a user with a new emoji generated by a vehicle according to an embodiment. Referring to FIG. 10, the vehicle 1 according to an embodiment may further include a display 240, and the display 240 may be configured to display a new emoji generated by the emoji generator 120. The display 240 may be configured to display a new emoji to the user to confirm use of the new emoji, or may display a new emoji to use the new emoji.

The new emoji generated by the apparatus 100 for generating an emoji may be used for various purposes. For example, the new emoji may be transmitted together with text when transmitting a message, the new emoji may be displayed on the outside of the vehicle, or during a conversation between a user and a personal agent for a vehicle, the new emoji may be displayed together with text converted from an utterance of the user or from an utterance of the agent. As a specific example, as shown in FIG. 11, the display 240 of the vehicle 1 may include an internal display 241 provided in the vehicle 1. For example, the internal display 241 may be an audio video navigation (AVN) display of an AVN device.

When the apparatus 100 for generating an emoji generates a new emoji according to the above-described method, the generated new emoji NEM is displayed on the internal display 241 and a screen for receiving confirmation of use of the new emoji NEM may be displayed together with the new emoji. In the case of the example of FIG. 11, the user may select a YES button 241a or a NO button 241b by manipulating an input device provided in the vehicle 1, or may input a user utterance "yes" or "no" to the microphone 230 to input a command for confirming whether to use the new emoji NEM.

As an example, the following description is made in relation to a case in which an utterance of a user input into the microphone 230 "Gil-dong, I'm driving right now and I'm so hungry. We should have something to eat" is for sending a message. When context information identified based on the utterance input by the user indicates "hunger" and "on driving" (the user's state), and context information acquired by the sensor device 210 or the communicator 220 indicates "hot weather", and an intent of the user identified based on the utterance of the user indicates that the user wants to have a meal, a new emoji NEM as shown in FIG. 12 may be generated by the above-described process.

As shown in FIG. 11 described above, the controller 250 may be configured to operate the display 241 to display the new emoji NEM and the screen for confirming whether to use the new emoji NEM. When the user inputs a command for using the new emoji NEM through a manipulation of the input device or through an utterance, the new emoji NEW may be transmitted to a mobile device M of a recipient (Gildong) together with text representing the user's utterance and displayed.

In addition, to show the user a message to be transmitted to the recipient, the new emoji NEM may be displayed even on the internal display 141 together with text indicating the user's utterance. As another example, the following description is made in relation to a case in which the display 240 of the vehicle 1 includes an external display 242 provided on the outside of the vehicle 1 and an image or text may be displayed on the external display 242.

When the user inputs an utterance "Please indicate I will wait for them to cross" into the microphone 230, and context information acquired by the sensor device 210 or the communicator 220 indicates snowy weather, a crosswalk located in front of the vehicle, and an intent of a user identified based on the user's utterance indicates that the driver will wait for the pedestrian to cross the crosswalk, a new emoji NEM as shown in FIG. 13 may be generated by the above-described process.

The generated new emoji NEM may be displayed on the external display 242 together with text representing the user's utterance. The new emoji NEM generated by the apparatus 100 for generating an emoji according to the embodiment may be used for various purposes other than the above-described examples.

Hereinafter, an embodiment of a method for generating an emoji according to an embodiment will be described. The above-described apparatus 100 for generating an emoji may be used in performing the method of generating an emoji according to the embodiment. Accordingly, the contents described above with reference to FIGS. 1 to 13 may be applied to the embodiment of the emoji generating method, unless otherwise mentioned.

Figure 14:
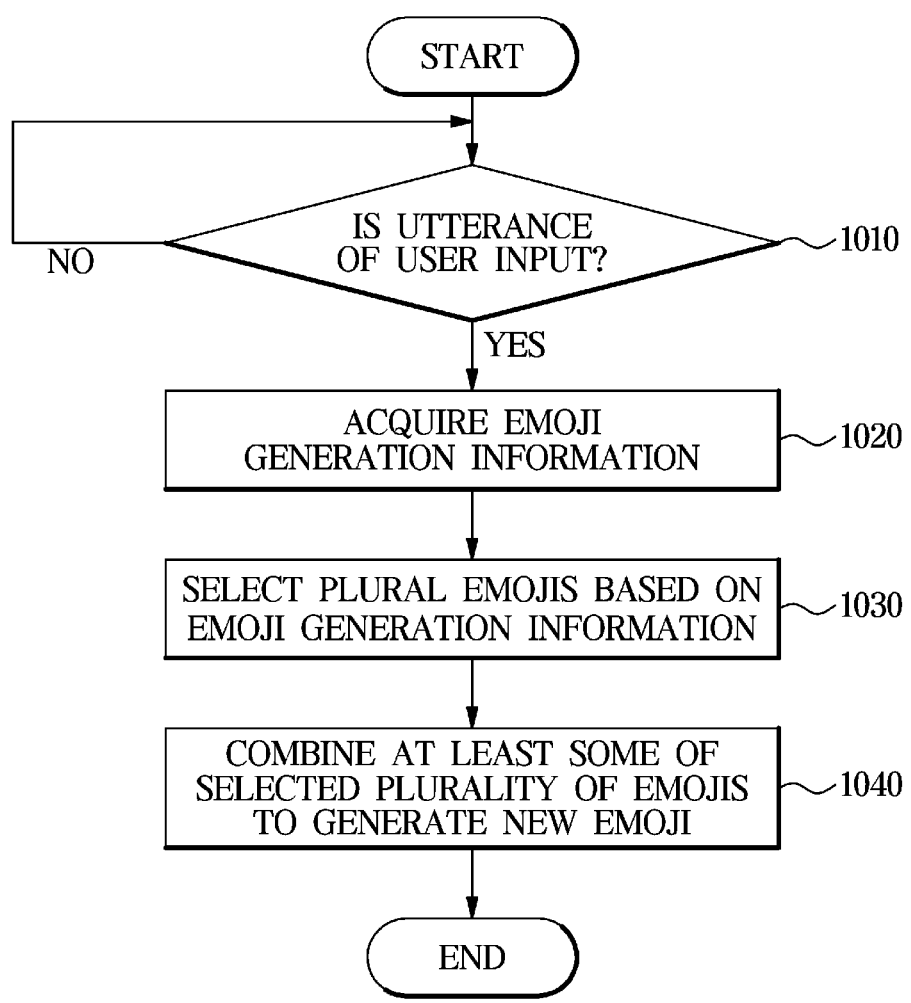
FIG. 14 is a flowchart showing a method of generating an emoji according to an embodiment.

FIG. 14 is a flowchart showing a method of generating an emoji according to an embodiment. Referring to FIG. 14, when an utterance of a user is input (YES in operation 1010), the analyzer 110 of the apparatus 100 for generating an emoji may acquire emoji generation information (1020).

The emoji generation information may include at least two of context information, information about a user's sentiment, and information about a user's intent. When a user inputs an utterance through the microphone (230 in FIG. 3) provided in the user terminal, speech recognition and natural language understanding of the user's utterance may be performed by the user terminal or an external server connected to the user terminal. The analyzer 110 may be configured to receive an input of a speech signal and text representing the user's utterance, and information about an intent corresponding to the user's utterance.

The analyzer 110 may be configured to identify the current context based on information acquired from the user terminal or other external server, or identify the current context based on the user's utterance converted into text or the user intent. In addition, the analyzer 110 may be configured to identify the user's sentiment based on the user's utterance converted into text or the user's intent, or identify the user's sentiment based on the speech signal of the user.

The emoji generator 120 may be configured to select a plurality of emojis based on the emoji generation information (1030), and combine at least some of the selected plurality of emojis to generate a new emoji (1040). The generated new emoji may be provided to the user in various ways. The apparatus 100 for generating an emoji may displayed on a user terminal provided with or connected to the apparatus 100 for generating an emoji, or may be included in a message transmitted from the user to a specific recipient.

Figure 15:
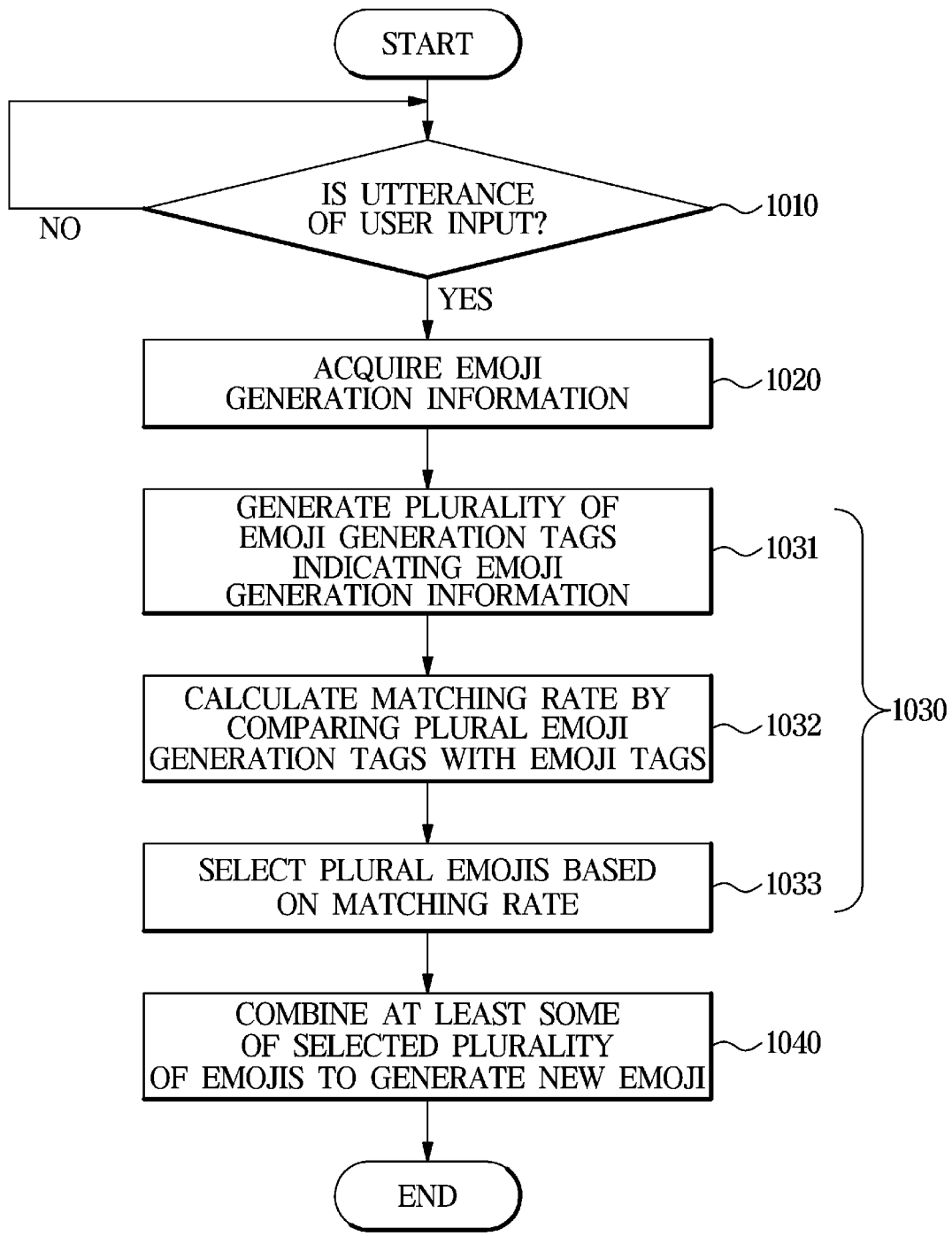
FIG. 15 is a detailed flowchart showing a process of selecting a plurality of emojis, in a method of generating an emoji according to an embodiment.

FIG. 15 is a detailed flowchart showing a process of selecting a plurality of emojis, in a method of generating an emoji according to an embodiment. Referring to FIG. 15, the selecting of the plurality of emojis (1030) may include generating a plurality of emoji generation tags indicating emoji generation information (1031).

For example, the emoji generator 120 may be configured to generate a first emoji generation tag representing the context information, a second emoji generation tag representing the user's sentiment, and a third emoji generation tag representing the user's intent. A detailed description of a method for generating an emoji generation tag is the same as described above in the embodiment of the apparatus 100 for generating an emoji. In addition, the selecting of the plurality of emojis (1030) may further include calculating a matching rate by comparing a plurality of emoji generation tags with emoji tags (1032).

As described above, a plurality of emojis may be stored in the storage 130 together with emoji tags corresponding thereto. The emoji tag may be metadata representing characteristics of the emoji. For one emoji, one emoji tag may be stored or a plurality of emoji tags may be stored. The emoji generator 120 may be configured to compare the plurality of emoji generation tags with the plurality of emoji tags to calculate a matching rate for each of the plurality of emoji tags with respect to the plurality of emoji generation tags.

The matching rate calculated for each emoji tag indicates the degree to which the emoji tag matches the emoji generation tag, and may indicate the degree to which the corresponding emoji matches the emoji generation information. A description of the method of calculating the matching rate between the emoji generation tag and the emoji tag is the same as described above in the embodiment of the apparatus 100 for generating an emoji.

In addition, the selecting of the plurality of emojis (1030) may further include selecting a plurality of emojis based on the matching rate (1033). The emoji generator 120 may be configured to only select an emoji having a matching rate calculated to be greater than or equal to a reference value as an emoji matching the image generation information. For example, when the reference value is set to 0.8, only emoji having a matching rate of 0.8 or higher with the emoji generation information may be used to generate a new emoji. When the plurality of emojis are selected (1030), at least some of the selected plurality of emojis are combined to generate a new emoji (1040).

FIG. 16 is a detailed flowchart showing a process of generating a new emoji by combining a plurality of emojis, in a method of generating an emoji according to an embodiment. Referring to FIG. 16, the generating of a new emoji (1040) may include classifying the selected plurality of emojis by categories (1041). In particular, the category is a category according to the characteristics of the emoji, and for example, may be divided into three types of categories, a first category, a second category, and a third category, corresponding to the layout of the new emoji.

If the emoji is an emoji that represents a face or facial expression of a person, the emoji is classified into the first category, and if the emoji is an emoji that represents various objects, or a specific action of a person, or an object together with a body part of a person, the emoji is classified into the second category. In addition, if the emoji is an emoji that represents a context, such as a surrounding background, environment, or weather, the emoji may be classified into the third category.

In addition, the generating of the new emoji (1040) may further include selecting one emoji per category as a sub-emoji (1042). Meanwhile, when two or more emojis are included in the same category, the emoji generator 120 may be configured to select an emoji having the highest matching rate among the two or more emojis included in the same category as a sub-emoji constituting a new emoji. In particular, if there is less than one sub-emoji selected, the emoji generator 120 may not generate a new emoji. In addition, the generating of the new emoji (1040) may further include generating a new emoji by arranging the sub-emoji in a region corresponding to the classified category (1043).

Referring again to the example of FIG. 8, a sub-emoji EM1 classified into the first category is arranged in the first region R1, a sub-emoji EM2 classified into the second category is arranged in the second region R2, and a sub-emoji EM3 classified into the third category is arranged in the third region R3. In addition, the emoji generator 120 may also be configured to adjust the size of each sub-emoji according to the matching rate of the sub-emoji constituting the new emoji. For example, a sub-emoji with a higher matching rate may be set to larger in the new emoji, and a sub-emoji with a lower matching rate may be set to be smaller in the new emoji. According to the above-described apparatus for generating an emoji, a vehicle including the same, and a method of generating an emoji, an emoji appropriate for a current context, a user's sentiment, or a user's intent may be newly generated and provided.

As is apparent from the above, the emoji generating apparatus, the vehicle including the same, and the emoji generating method may generate a new emoji that can most appropriately represent the sentiment or intent of a user or the current context based on information acquired from an utterance of the user. The emoji generating apparatus, the vehicle including the same, and the emoji generating method can generate a new emoji by combining a plurality of existing emojis to most appropriately represent the sentiment or intent of a user or the current context.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

What is claimed is:

1. An apparatus for generating an emoji, the apparatus comprising:
an analyzer configured to, in response to an utterance of a user being input, acquire at least one of context information or information about a sentiment of the user; and
an emoji generator configured to;
generate a new emoji based on emoji generation information including information related to at least two among the context information, the information about the sentiment of the user, and information about an intent of the user corresponding to the utterance,
select a plurality of emojis that match the emoji generation information from among a plurality of stored emojis,
combine at least some of the plurality of emojis to generate the new emoji,
calculate a matching rate between a plurality of emoji generation tags representing the emoji generation information and a plurality of emoji tags representing the plurality of emojis;
select an emojis having a matching rate greater than or equal to a reference value from among the plurality of emojis,
classify the selected plurality of emojis into a plurality of categories according to characteristic of the emojis; and
select at least two emojis from among the selected plurality of emojis as sub-emojis used to generate the new emoji according to the classifying of the selected plurality of emojis.

2. The apparatus of claim 1, wherein the emoji generator is configured to generate the plurality of emoji generation tags representing the emoji generation information.

3. The apparatus of claim 2, wherein the plurality of emoji generation tags include:
at least two among a first emoji generation tag representing the context information, a second emoji generation tag representing the sentiment of the user, and a third emoji generation tag representing the intent of the user.

4. The apparatus of claim 2, wherein the plurality of emojis are stored together with the plurality of emoji tags representing the plurality of emojis, respectively.

5. The apparatus of claim 4, wherein the emoji generator is configured to:
compare the plurality of emoji generation tags with the plurality of emoji tags; and
select a plurality of emojis matching the emoji generation information from among the stored plurality of emojis based on the comparing of the plurality of emoji generation tags with the plurality of emoji tags.

6. The apparatus of claim 5, wherein the emoji generator is configured to arrange the at least two sub-emojis in a region corresponding to a classified category to generate the new emoji.

7. The apparatus of claim 6, wherein the plurality of categories include a first category, a second category and a third category, and the emoji generator is configured to:
arrange an emoji classified into the second category in a lower region;
arrange an emoji classified into the third category in an upper region; and
arrange an emoji classified into the first category in a middle region between the lower region and the upper region.

8. The apparatus of claim 7, wherein the emoji generator is configured to:
classify an emoji representing a face or facial expression of a person among the selected plurality of emojis into the first category;
classify an emoji representing at least one of an object, a specific action of a person, or a body part of a person among the selected plurality of emojis into the second category; and
classify an emoji representing at least one of a background, an environment, and a weather among the selected plurality of emojis into the third category.

9. The apparatus of claim 1, wherein the emoji generator is configured to, in response to a plurality of emojis being classified into one category among the plurality of categories, select an emoji having a highest matching rate among the plurality of emojis as the sub-emoji.

10. The apparatus of claim 1, wherein the emoji generator is configured to determine a size of each of the at least two sub-emojis in the new emoji based on a matching rate of each of the at least two sub-emojis.

11. The apparatus of claim 10, wherein the emoji generator is configured to
determine an emoji with a higher matching rate between the at least two sub-emojis to have a size greater than a size of the emoji with a lower matching rate.

12. A method of generating an emoji, the method comprising:
in response to an utterance of a user being input, acquiring, by a processer, at least one of context information or information about a sentiment of the user; and
generating, by the processor, a new emoji based on emoji generation information including information related to at least two among the context information, the information about the sentiment of the user, and information about an intent of the user corresponding to the utterance,
wherein the generating of the new emoji includes:
selecting, by the processor, a plurality of emojis that match the emoji generation information from among a plurality of stored emojis;
combining, by the processor, at least some of the plurality of emojis to generate the new emoji,
calculating a matching rate between a plurality of emoji generation tags representing the emoji generation information and a plurality of emoji tags representing the plurality of emojis,
selecting an emoji having a matching rate greater than or equal to a reference value from among the plurality of emojis,
classifying the selected plurality of emojis into a plurality of categories according to characteristic of the emojis, and
selecting at least two emojis from among the selected plurality of emojis as sub-emojis used to generate the new emoji according to the classifying of the selected plurality of emojis.

13. The method of claim 12, wherein the generating of the new emoji includes generating the plurality of emoji generation tags representing the emoji generation information.

14. The method of claim 13, wherein the plurality of emoji generation tags include:
at least two among a first emoji generation tag representing the context information, a second emoji generation tag representing the sentiment of the user, and a third emoji generation tag representing the intent of the user.

15. The method of claim 13, wherein the plurality of emojis are stored together with the plurality of emoji tags representing the plurality of emojis, respectively.

16. The method of claim 15, wherein the generating of the new emoji includes comparing the plurality of emoji generation tags with the plurality of emoji tags, and selecting a plurality of emojis matching the emoji generation information from among the stored plurality of emojis based on the comparing of the plurality of emoji generation tags with the plurality of emoji tags.

* * * * *